(12) United States Patent
Lord

(10) Patent No.: US 12,743,625 B2
(45) Date of Patent: Sep. 22, 2026

(54) SATELLITE-BASED QKD

(71) Applicant: BRITISH TELECOMMUNICATIONS PUBLIC LIMITED COMPANY, London (GB)

(72) Inventor: Andrew Lord, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 837 days.

(21) Appl. No.: 17/995,185

(22) PCT Filed: Mar. 22, 2021

(86) PCT No.: PCT/EP2021/057295

§ 371 (c)(1),
(2) Date: Sep. 30, 2022

(87) PCT Pub. No.: WO2021/197903

PCT Pub. Date: Oct. 7, 2021

(65) Prior Publication Data

US 2023/0177339 A1 Jun. 8, 2023

(30) Foreign Application Priority Data

Mar. 30, 2020 (EP) .................................... 20166771

(51) Int. Cl.
*G06N 3/00* (2023.01)
*G06N 3/084* (2023.01)
*H04L 9/08* (2006.01)

(52) U.S. Cl.
CPC ........... *G06N 3/084* (2013.01); *H04L 9/0852* (2013.01)

(58) Field of Classification Search
None
See application file for complete search history.

(56) References Cited

U.S. PATENT DOCUMENTS

2001/0055389 A1* 12/2001 Hughes ................. H04L 9/0858 380/44
2008/0292102 A1* 11/2008 Wang ................... H04L 9/0852 380/256

(Continued)

FOREIGN PATENT DOCUMENTS

CN 110601826 A 12/2019
CN 110798314 A * 2/2020 ........... H04L 9/0852

OTHER PUBLICATIONS

CN110789312—Wang Q et al.*

(Continued)

*Primary Examiner* — Radu Andrei
(74) *Attorney, Agent, or Firm* — EIP US LLP

(57) ABSTRACT

There is herein disclosed a computer-implemented method of optimizing a QKD system, the QKD system being adapted to perform a QKD session that involves the propagation of a plurality of photons from a first device to a second device, one of the first and second devices being located aboard a satellite in orbit, the method including running a machine learning algorithm, inputs of the machine learning algorithm comprising one or more values of one or more of the following factors: atmospheric conditions in the vicinity of a path from the first device to the second device; a spatial separation of the first device and the second device; and a measure of the performance of the first and/or the second device, wherein the output of the algorithm is an estimate of the rate at which the first device and the second device generate bits of a quantum key.

10 Claims, 3 Drawing Sheets

(56) References Cited

U.S. PATENT DOCUMENTS

| | | | | |
|---|---|---|---|---|
| 2009/0268901 | A1* | 10/2009 | Lodewyck | H04L 9/0852 380/279 |
| 2019/0245685 | A1* | 8/2019 | Yoshino | H04J 7/00 |
| 2019/0394031 | A1* | 12/2019 | Deng | H04L 9/0852 |
| 2021/0014226 | A1* | 1/2021 | Zhao | H04L 9/50 |
| 2021/0175977 | A1* | 6/2021 | Cavaliere | H04J 14/0267 |

OTHER PUBLICATIONS

Hosseinidehaj et al; Satellite-based CVQ Communication.*
Wang W et al; Machine Learning QKD.*
Hosseinidehaj et al; Satellite-based CVQ Communication; IEEE; pp. 884-919;2019.*
Wang W et al; Machine Learning QKD; Physical Review; pp. 062334-1 to 062334-11; 2019.*
Roger; Real-time gigahertz free-space quantum key distribution within satellite overpass; Science Advances; 10 pages; 2023.*
Bedington; Progress in satellite quantum key distribution; npj Qunatum Information; 13 pages; 2017.*
Zhao , et al., "Proposal of Usecases of Machine Learning on Draft Recommendation Y.QKDN-CM; C166", 17741-C166 (Feb. 2003), International Telecommunication Union, vol. 16, No. 13 Retrieved from the Internet: <https://www.itu.int/ifa/t/2017/sgl3/docs/rgm/17741-200302/C/T17-SG13RGM-17741-200302-C-O 166.docx>, 2020, pp. 1-3.
Bedington R., et al., "Progress in Satellite Quantum Key Distribution," NPJ Quantum Information, vol. 3, No. 1, Aug. 9, 2017, 13 pages.
Combined Search and Examination Report under Sections 17 and 18(3) for Great Britain Application No. 2004606.6, mailed on Jan. 11, 2021, 11 pages.
Ecker S., et al., "Achieving Unprecedented High Secure Key Rates over a Representative Satellite Link," Cornell University Library, Oct. 17, 2019, Retrieved from the Internet: URL: https://arxiv.org/pdf/1910.07889vl.pdf, 4 pages.
Extended European Search Report for Application No. 20166771.4 mailed on Sep. 8, 2020, 8 pages.
International Search Report and Written Opinion for Application No. PCT/EP2021/057295, mailed on May 26, 2021, 11 pages.
Liao S., et al., "Satellite-to-ground Quantum Key Distribution," Nature, Sep. 7, 2017, vol. 549, pp. 43-59.
Nedasadat H., et al., "Satellite-Based Continuous-Variable Quantum Communications: State-of-the-Art and a Predictive Outlook," IEEE Communications Surveys & Tutorials, 2019, vol. 21, pp. 881-919.
Vergoossen T., et al., "Satellite Constellations for Trusted node QKD Networks," Mar. 19, 2019, arXiv:1903.07845v1 [quant-ph], 12 pages.
Wang W., et al., "Machine Learning for Optimal Parameter Prediction in Quantum Key Distribution," Cornell University Library, Dec. 19, 2018, Retrieved from the Internet: URL: https://arxiv.org/pdf/1812.07724v1.pdf, 9 pages.

* cited by examiner

| **Earth Station** | **1** | **2** | **3** |
|---|---|---|---|
| Separation (km) | 1500 | 2000 | 2500 |
| Bit generation rate (kbit/s) | 100Mb/s | 50Mb/s | 120Mb/s |
| Air Pressure (kPa) | 85 | 80 | 75 |
| Humidity (%) | 43 | 10 | 81 |
| Light pollution (Bortle scale) | 5 | 2 | 8 |
| Key generation rate | 100kb/s | 70kb/s | 40kb/s |

Fig. 2

SATELLITE-BASED QKD

PRIORITY CLAIM

The present application is a National Phase entry of PCT Application No. PCT/EP2021/057295, filed Mar. 22, 2021, which claims priority from EP patent application No. 20166771.4, filed Mar. 30, 2020 each of which is hereby fully incorporated herein by reference.

BACKGROUND

QKD (Quantum Key Distribution) is a technique for distributing very secure symmetrical encryption keys between parties. It involves the transmission of a stream of photons between the parties. This places an upper limit on the spatial separation of the parties. If the parties are located too far apart, attenuation of the photon stream becomes significant.

A solution to this difficulty is satellite-based QKD. In an example embodiment of this, a quantum transmitter aboard a satellite in low earth orbit, performs QKD with a quantum receiver on the ground and establishes a first quantum key. The satellite continues its orbit and performs a further QKD session with a second quantum receiver, located remotely from the first, establishing a second quantum key. The transmitter encrypts the first quantum key using the second and transmits it to the second receiver. The first and second receivers therefore each have the first quantum key. They can use this key to communicate with each other securely. Thus satellite-based QKD enables quantum-secured communication between remote parties.

A disadvantage of satellite-based QKD is that it involves transmitting the photon stream through the earth's atmosphere. This can cause problems. For example, it can be difficult to achieve directional alignment of the transmitter with the receiver. Also, attenuation of the photon stream can be significant.

SUMMARY

It is desirable to overcome and/or mitigate the above-mentioned and/or other problems associated with conventional approaches.

According to a first aspect of the invention there is provided a method of optimizing a QKD system, the QKD system being adapted to perform a QKD session that involves the propagation of a plurality of photons from a first device to a second device, one of the first and second devices being located aboard a satellite in orbit, the method comprising running a machine learning algorithm, the inputs of the machine learning algorithm comprising one or more values of one or more of the following factors:

(i) Atmospheric conditions in the vicinity of a path from the first device to the second device;

(ii) The spatial separation of the first device and the second device; and (iii) A measure of the performance of the first and/or the second device, wherein the output of the algorithm is an estimate of the rate at which the pair generate bits of a quantum key.

An advantage of embodiments of the disclosure is that it enables the estimation of the likely quantum key bit rate resulting from a QKD session between a satellite-based quantum communication device and multiple candidate ground-based quantum communication devices, considering the prevailing conditions. This enables the ground-based quantum communication devices to be ranked in order of likely productivity. The satellite can then perform QKD sessions with the ground-based devices in order of their ranking. This greatly increases the key generation rate of the system.

The first device may be a quantum transmitter and the second device may be a quantum receiver. Alternatively, the first device may be a quantum receiver and the second device may be a quantum transmitter. In presently advantageous embodiments the first device may be the device located aboard the satellite and may be a quantum transmitter. In these embodiments the second device may be located on the earth and may be a quantum receiver.

The pair may be capable of performing QKD according to prepare-and-measure or quantum entanglement protocols.

The quantum communication device that is located on the earth may be located on land, and may be located in a building which may be a ground station. Alternatively the device may be located at sea, for example, aboard a ship.

The atmospheric conditions in the vicinity of a path from one device of the pair to the other may comprise air pressure, humidity, cloud coverage and pollution. Pollution may comprise light pollution and air pollution.

The method may comprise obtaining the one or more values for the one or more of the factors (i)-(iii). This may comprise measuring the one or more values for the one or more of the factors (i)-(iii) at the satellite and/or at the earth station, or receiving such measured value(s). Alternatively or in addition this may comprise obtaining the one or more values from existing recorded data, stored locally or remotely, which may be public data.

The one or more values for the spatial separation of the pair may be obtained from a global positioning measurement system such as GPS. The one or more values for a measure of the performance of one or both of the pair of devices may be a data transmission rate or may be a data detection rate. In embodiments in which factor (iii) is a measure of the performance of the first and the second device, the performance may comprise a measure of the key bit generation rate resulting from a QKD session between the first device and the second device. The inputs of the machine learning algorithm may comprise all of the factors (i)-(iii).

The machine learning algorithm may comprise a neural network. The method may comprise, preliminarily, training the algorithm using training data. The training may comprise running the algorithm using measurements of factors (i)-(iii) as training inputs to the neural network and may comprise producing an estimate of a quantum key generation bit rate as an output of the neural network. The method may comprise running multiple training operations sequentially, each using different training data. As would be familiar to the skilled person, each of the multiple training operations may involve adjusting the neural network weights using backpropagation.

The method may comprise running the algorithm in respect of multiple pairs, each pair comprising the same satellite-based device and a different earth-based device. The method may further comprise ranking the earth-based communication devices in order of estimated key generation bit rate. The method may comprise taking the demand for quantum keys currently being experienced by a particular earth-based device into account when performing the ranking.

In some embodiments the QKD system comprises one or more further pairs. The method may further comprise running the machine learning algorithm wherein the factors (i)-(iii) relate to the one or more further pairs. The one or more further pairs may comprise a different satellite-based communication device and the same earth-based communication device as that of first pair. The method may further comprise performing a comparison of the output of the algorithm in respect of the first pair with the output of algorithm in respect of the one or more further pairs. The method may further comprise using the outcome of this comparison to select one of the satellite-based devices to perform QKD with the earth-based device. In these embodiments, the method further comprises ranking the satellite-based communication devices in order of preference. This ranking step may take into account the estimated key generation bit rate between a ground-based device and a satellite-based device. This ranking step may also take into account the key demands of the ground-based device.

In some embodiments the second device may be a quantum receiver and may be located on the earth. In these embodiments, the first device receives the plurality of photons from a transmitter based on the ground and directs the plurality of photons to the second device.

In some embodiments the first device is the device located aboard the satellite. In these embodiments the second device may be located aboard a second satellite.

In some embodiments the machine-learning algorithm is a component of a larger algorithm, which may comprise deterministic functions.

The method can be performed by one or a combination of the first device and the second device.

According to a second aspect of the disclosure there is provided a QKD system, the QKD system being adapted to perform a QKD session that involves the propagation of a plurality of photons from a first device to a second device, one of the first and second devices being located aboard a satellite in orbit, the QKD system being adapted to run a machine learning algorithm, the inputs of the machine learning algorithm comprising one or more values of one or more of the following factors:

(i) Atmospheric conditions in the vicinity of a path from the first device to the second device;
(ii) The spatial separation of the first device and the second device; and
(iii) A measure of the performance of the first and/or the second device, wherein the output of the algorithm is an estimate of the rate at which the pair generate bits of a quantum key.

BRIEF DESCRIPTION OF THE DRAWINGS

Embodiments of the disclosure will now be described in detail, for illustration only, and with reference to the appended drawings in which:

FIG. 2 is a table showing typical training data that could be used in a method in accordance with the disclosure.

DETAILED DESCRIPTION

Figure 1:
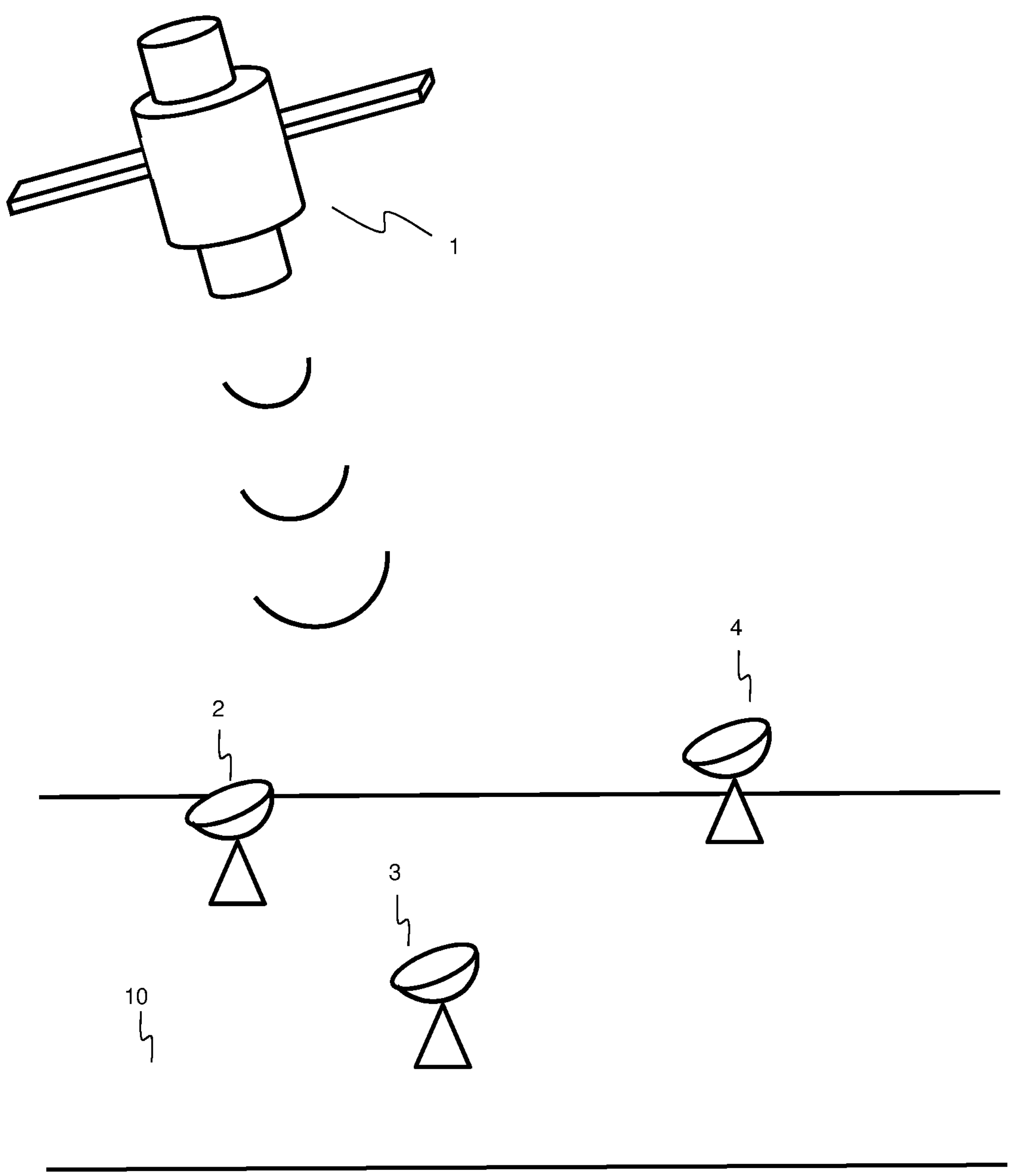
FIG. 1 is a schematic representation of a satellite capable of communicating with three earth stations each containing a QKD receiver.

FIG. 1 shows a Low Earth Orbit (LEO) satellite 1. The satellite carries a quantum transmitter suitable for performing QKD (not shown). The quantum transmitter will be referred to as Alice 1. As the satellite progresses along its orbit, it comes within communicating range of one or more earth stations 2,3,4. By "earth station" it is meant an earth-based quantum communication device (in this case a quantum receiver), located on earth 10. The earth stations shown in FIG. 1 are buildings 2,3,4. Each of the buildings contain a quantum receiver, which will be referred to as Bob. The satellite 1 performs a QKD session with the earth station 2 in order to distribute a plurality of quantum keys between the satellite 1 and the earth station 2. This QKD session uses the E91 QKD protocol. Specifically, a series of entangled photon pairs are produced aboard the satellite 1. One photon of each pair is directed into a detector aboard the satellite 1. The other photon of each pair is transmitted through the atmosphere to the earth station 2. As is familiar to a person skilled in the art, each of Alice 1 and Bob 2 measure its respective incoming photons in one of a plurality of non-orthogonal basis states. This is known as the quantum transmission step. There then follows a key agreement step, in which Alice 1 and Bob 2 send each other, via a classical channel, an indication of which basis states each used to measure their photons. Alice 1 and Bob 2 then discard the measurements they made in respect of the photons for which they used different basis states. This leaves Alice 1 and Bob 2 with the same list of measurements (i.e. 1's and 0's) which constitutes a shared secret key.

This process is repeated multiple times so as to generate a plurality of such secret keys. The number of keys that Alice 1 and Bob 2 successfully generate per unit time depends on various factors. These factors comprise:

(i) weather conditions, such as atmospheric pressure and humidity;
(ii) light pollution, such as light from buildings and vehicles;
(iii) the separation of Alice from Bob—i.e. the straight-line distance between them);
(iv) the performance of Alice and Bob—i.e. the rate at which Alice and Bob are able to accurately measure incoming photons.

While the QKD session described above is taking place, Alice 1 and Bob 2 each measure and record data values for the above factors. The rate at which Alice 1 and Bob 2 successfully generate quantum keys during the session is also recorded.

Alice will, at some point in the future, transmit the keys she now has as a result of the QKD session to a third party (not shown) so that that the third party can communicate in encrypted form with the earth station 2 using the keys. If Bob 2 transmits his keys to a fourth party (not shown), the third and fourth parties could use the keys for secure encrypted communication. In passing on the secure keys to other parties Alice and Bob have acted as trusted nodes.

Following termination of the QKD session between Alice 1 and Bob 2, Alice 1 initiates a QKD session with another Bob 3. Bob 3 is located in earth station 3. It is desired that this second Bob 3 also establish a plurality of quantum keys with Alice 1. Therefore, Alice 1 and the second Bob 3 perform a QKD session in the manner described above in relation to the first Bob 2. As in that session, Alice 1 and the second Bob 3 record data values for the above-mentioned factors (i)-(iv), along with the rate at which Alice 1 and the second Bob 3 successfully generate quantum keys during the session. As in the first session, the resulting quantum keys can then be distributed to other entities to facilitate secure quantum-encrypted communication.

Alice 1 repeats this process of performing QKD and recording data values for the above factors. The recorded data values are recorded in a central database, along with similar recorded values from other satellites. Over time, a large quantity of such data values in respect of factors (i)-(iv), along with the corresponding quantum key generation rates, in relation to multiple satellites, are accumulated in the database.

During much of a QKD satellite's orbit the on board Alice 1 is within range of multiple Bobs 2,3,4, each of which desires to perform QKD. (The satellite need not be directly overhead in order to perform QKD with a Bob). The present invention enables Alice 1, at any given time, to choose which Bob 2, 3, 4 will give the optimal QKD performance in view of the data values for factors (i)-(iv), prevailing at the time. The present embodiment of the invention achieves this using a machine-learning algorithm.

The purpose of the algorithm is to use the values of factors (i) to (iv) that are prevailing at a given time in order to estimate a value for the key generation rate obtainable during QKD between Alice 1 and a particular Bob 2,3,4. Alice 1 can, for example, use the algorithm to obtain quantum key generation rate estimates for each of the possible Bobs with which she could perform QKD, and perform QKD with the Bobs in order of the estimated rates, starting with the highest. Such an algorithm is achieved as follows.

Figure 3:
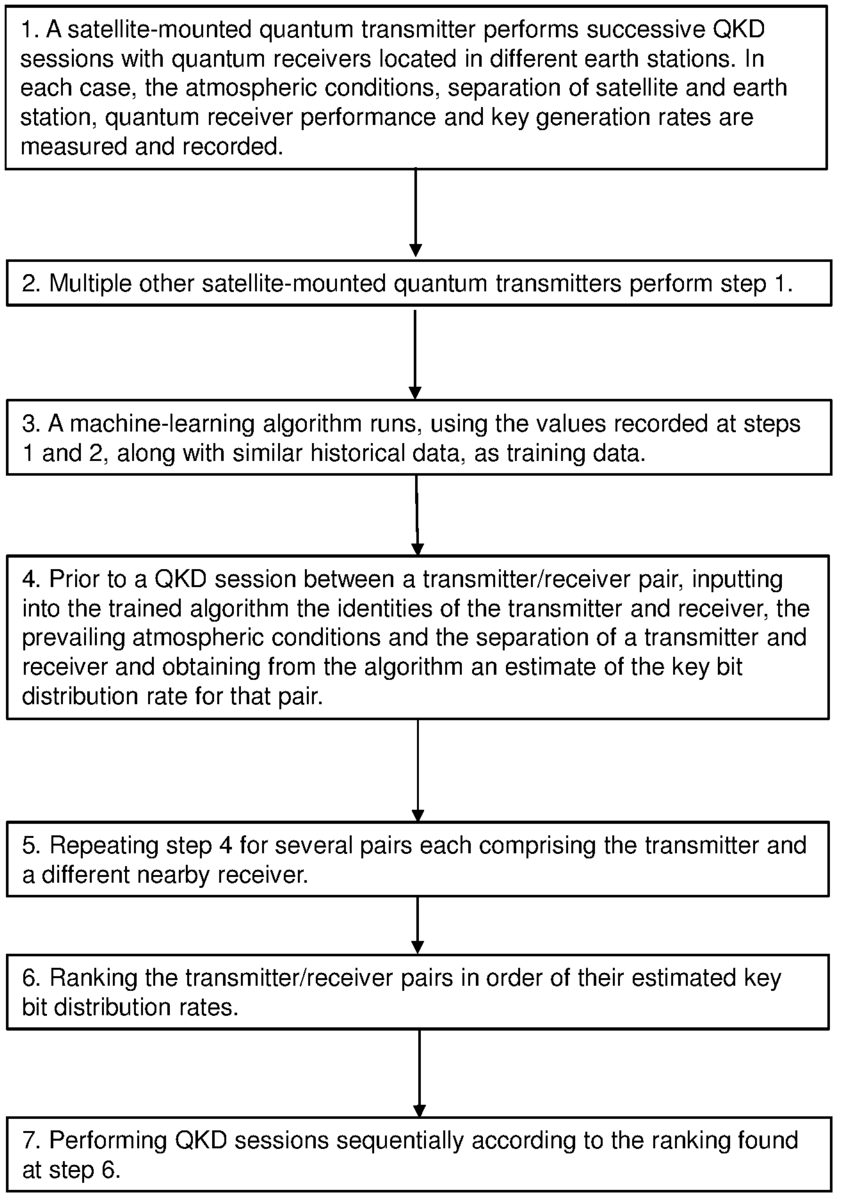
FIG. 3 is a flow chart showing a method in accordance with the disclosure.

The data values recorded in the database in respect of factors (i)-(iv) constitute training data for the machine learning algorithm. Typical examples of training data are shown in the table in FIG. 2. In particular, each of a given set of values obtained during one session, e.g. humidity, separation of Alice 1 from a given Bob 2,3,4, is used as an input to the algorithm. The algorithm uses randomly-chosen weighting values and produces an initial output. This is compared to the key generation rate that was measured by Alice 1 in respect of the QKD session in question. A process of back propagation is then performed which makes small adjustments to the weights of the neural network in order to more closely align the algorithm output with the key generation rate, in a manner which would be familiar to the skilled person. This process is repeated for all the training data. Thereafter, before Alice 1 begins a QKD session, she measures values for the factors (i)-(iv) in respect of each of the Bobs 2,3,4 which are close enough to perform QKD with. The algorithm will produce an estimate for each Bob 2,3,4 ranking the Bobs 2,3,4 in order of their estimated key generation rate. This process is shown in the flow chart in FIG. 3.

The optimization process also takes into account the various key demands of the different available Bobs 2,3,4. It may be that one of the Bobs 2,3,4 has a very high key demand, but the algorithm estimates a relatively low key generation rate for it. The optimization process applies a key demand-dependent weighting to that particular Bob, ensuring that its high key demand acts to move that Bob up Alice's priority rankings. Alice then performs QKD with the different Bobs in order of their position in the rankings.

The invention claimed is:

1. A computer-implemented method of optimizing a quantum key distribution (QKD) system, the QKD system being adapted to perform a QKD session that involves propagation of a plurality of photons from a first device to a second device, one of the first device or the second device being located aboard a satellite in orbit and the other of the first device or the second device being located on Earth, the method comprising:

running a machine learning algorithm, inputs of the machine learning algorithm comprising one or more values of one or more:

atmospheric conditions in a vicinity of a path from the first device to the second device, a spatial separation of the first device and the second device, or a measure of a performance of at least one of the first device or the second device, wherein an output of the machine learning algorithm is an estimate of a rate at which the first device and the second device generate bits of a quantum key, and wherein the one of the first device or the second device that is located on Earth is ranked as a candidate for at least one further QKD session based on the estimate of the rate;

running the machine learning algorithm in respect of multiple pairs of first devices and second devices, each pair of a first device and a second device comprising the same satellite-based device and a different Earth-based device; and ranking the Earth-based devices in order of estimated key generation bit rate, further comprising taking a demand for quantum keys currently being experienced by a particular one of the multiple Earth-based devices into account when performing the ranking, wherein the ranking is related to productivity of the candidate to improve a key generation rate in the QKD system.

2. The method as claimed in claim 1, wherein the first device is located aboard the satellite.

3. The method as claimed in claim 1, wherein the second device is located on Earth.

4. The method as claimed in claim 1, wherein the inputs of the machine learning algorithm comprise one or more values of the atmospheric conditions, the atmospheric conditions comprising air pressure, humidity, cloud coverage, or pollution.

5. The method as claimed in claim 1, wherein the machine learning algorithm utilizes a neural network.

6. The method as claimed in claim 5, further comprising a preliminary training of running the machine learning algorithm using measurements of the spatial separation or the measure of the performance as training inputs to the neural network.

7. The method as claimed in claim 6, further comprising running multiple trainings sequentially, each training using different training data and comprising adjusting neural network weights using backpropagation.

8. A quantum key distribution (QKD) system comprising:

at least one processor and memory being adapted to perform a QKD session that involves propagation of a plurality of photons from a first device to a second device, one of the first device or the second device being located aboard a satellite in orbit and the other of the first device or the second device being located on Earth, the QKD system being adapted to run a machine learning algorithm, inputs of the machine learning algorithm comprising one or more values of one or more of:

atmospheric conditions in a vicinity of a path from the first device to the second device, a spatial separation of the first device and the second device, or a measure of a performance of at least one of the first device or the second device, wherein an output of the machine learning algorithm is an estimate of a rate at which the first device and the second device generate bits of a quantum key, and wherein the one of the first device or the second device that is located on Earth is ranked as a candidate for at least one further QKD session based on the estimate of the rate;

running the machine learning algorithm in respect of multiple pairs of first devices and second devices, each pair of a first device and a second device comprising the same satellite-based device and a different Earth-based device; and ranking the Earth-based devices in order of estimated key generation bit rate, further comprising taking a demand for quantum keys currently being experienced by a particular one of the multiple Earth-based devices into account when performing the ranking, wherein the ranking is related to productivity of the candidate to improve a key generation rate in the QKD system.

9. A non-transitory computer-readable storage medium storing a computer program adapted to, when loaded on and executed by a computer system, cause the computer system to perform a QKD session that involves propagation of a plurality of photons from a first device to a second device, one of the first device or the second device being located aboard a satellite in orbit and the other of the first device or the second device being located on Earth, the QKD system being adapted to run a machine learning algorithm, inputs of the machine learning algorithm comprising one or more values of one or more of:

atmospheric conditions in a vicinity of a path from the first device to the second device;

a spatial separation of the first device and the second device; or a measure of a performance of at least one of the first device or the second device, wherein an output of the machine learning algorithm is an estimate of a rate at which the first device and the second device generate bits of a quantum key, and wherein the one of the first device or the second device that is located on Earth is ranked as a candidate for at least one further QKD session based on the estimate of the rate;

running the machine learning algorithm in respect of multiple pairs of first devices and second devices, each pair of a first device and a second device comprising the same satellite-based device and a different Earth-based device; and ranking the Earth-based devices in order of estimated key generation bit rate, further comprising taking a demand for quantum keys currently being experienced by a particular one of the multiple Earth-based devices into account when performing the ranking, wherein the ranking is related to productivity of the candidate to improve a key generation rate in the QKD system.

10. The method as claimed in claim 6, further comprising producing an estimate of a quantum key generation bit rate as an output of the neural network.

* * * * *